(12) United States Patent
Ehrenberg et al.

(10) Patent No.: US 7,990,679 B2
(45) Date of Patent: Aug. 2, 2011

(54) NANOPARTICLE ULTRACAPACITOR

(75) Inventors: Scott G. Ehrenberg, Port Richey, FL (US); Liwei Cao, Odessa, FL (US)

(73) Assignee: Dais Analytic Corporation, Odessa, FL (US)

( * ) Notice: Subject to any disclaimer, the term of this patent is extended or adjusted under 35 U.S.C. 154(b) by 860 days.

(21) Appl. No.: 11/879,482

(22) Filed: Jul. 16, 2007

(65) Prior Publication Data

US 2008/0316678 A1 Dec. 25, 2008

Related U.S. Application Data

(60) Provisional application No. 60/830,583, filed on Jul. 14, 2006.

(51) Int. Cl.
*H01G 9/00* (2006.01)
*H01G 4/06* (2006.01)

(52) U.S. Cl. ....... 361/502; 361/523; 361/311; 29/25.03; 29/25.42

(58) Field of Classification Search .......... 361/502–503, 361/523, 511; 29/25.03, 25.42
See application file for complete search history.

(56) References Cited

U.S. PATENT DOCUMENTS

| | | |
|---|---|---|
| 4,248,759 A | 2/1981 | St. Clair |
| 4,822,857 A | 4/1989 | Gorman et al. |
| 5,136,474 A | 8/1992 | Sarangapani et al. |
| 5,239,010 A | 8/1993 | Balas et al. |
| 5,468,574 A | 11/1995 | Ehrenberg et al. |
| 5,679,482 A | 10/1997 | Ehrenberg et al. |
| 6,110,616 A | 8/2000 | Sheikh-Ali et al. |
| 6,341,056 B1 | 1/2002 | Allman et al. |
| 6,383,391 B1 | 5/2002 | Ehrenberg et al. |
| 6,413,298 B1 | 7/2002 | Wnek et al. |
| 6,699,941 B1 | 3/2004 | Handlin et al. |
| 6,841,601 B2 | 1/2005 | Serpico et al. |

(Continued)

FOREIGN PATENT DOCUMENTS

DE 580366 6/1933

(Continued)

OTHER PUBLICATIONS

Butkewitsch et al., "Dielectric properties of a hydrated sulfonated poly(styrene-ethylene/butylenes/styrene) triblock copolymer, " Applied Surface Science 252(23):8277-8286, Sep. 30, 2006.

(Continued)

*Primary Examiner* — Eric Thomas
(74) *Attorney, Agent, or Firm* — Mueting, Raasch & Gebhardt, P.A.

(57) ABSTRACT

Particular aspects provide capacitors, and particularly ultracapacitors, including molecules suitable to substantially increase the capacitance of the capacitor, and methods for making same, Particular aspects provide ultracapacitors that include nanoparticles optionally coated with molecules, such as polymer electrolytes. Certain aspects provide an energy storage device or capacitor, including at least three layers sealed in a fluid-tight covering, wherein a first layer includes at least one electrolytic polymer molecule of positive charge and at least one nanoparticle; a second dielectric layer including at least one insulative polymer; a third layer including at least one electrolytic polymer molecule of negative charge and at least one nanoparticle. In certain aspects, the electrolytic polymer of the first layer includes at least one high charge density polymer electrolyte of positive charge, and wherein the electrolytic polymer of the third layer includes at least one high charge density polymer electrolyte of negative charge.

22 Claims, 4 Drawing Sheets

U.S. PATENT DOCUMENTS

| | | | |
|---|---|---|---|
| 7,001,950 B2 | 2/2006 | Handlin, Jr. et al. | |
| 7,067,589 B2 | 6/2006 | Bening et al. | |
| 7,169,848 B2 | 1/2007 | Bening et al. | |
| 7,169,850 B2 | 1/2007 | Handlin, Jr. et al. | |
| 7,179,860 B2 | 2/2007 | Cao et al. | |
| 7,186,779 B2 | 3/2007 | Joly et al. | |
| 7,220,798 B2 | 5/2007 | Atwood et al. | |
| 2003/0077515 A1* | 4/2003 | Chen et al. | 429/231.8 |
| 2004/0264108 A1* | 12/2004 | Yamazaki et al. | 361/502 |
| 2006/0046149 A1* | 3/2006 | Yong et al. | 429/251 |
| 2007/0004830 A1 | 1/2007 | Flood et al. | |
| 2007/0020473 A1 | 1/2007 | Umana et al. | |
| 2007/0021569 A1 | 1/2007 | Willis et al. | |
| 2007/0026251 A1 | 2/2007 | Umana | |
| 2007/0037927 A1 | 2/2007 | Yang | |
| 2007/0055015 A1 | 3/2007 | Flood et al. | |
| 2008/0316678 A1* | 12/2008 | Ehrenberg et al. | 361/503 |

FOREIGN PATENT DOCUMENTS

| | | | |
|---|---|---|---|
| JP | 2003272972 A | * | 9/2003 |
| JP | 2006272972 A | * | 10/2006 |

OTHER PUBLICATIONS

Gilbert, "The Reactions of Sulfur Trioxide, and of Its Adducts, with Organic Compounds," Chemical Reviews 62(6):549-589, 1962.

Jenkins et al., "Glossary of Basic Terms in Polymer Science," Pure and Applied Chemistry 68(12):2287-2311, 1996.

Ring et al., "Source-Based Nomenclature for Copolymers," Pure and Applied Chemistry 57(10):1426-1440, 1985.

Yang et al., "Dielectric properties of polymer nanoparticle composites," Polymer 48(3):791-798, Jan. 26, 2007.

* cited by examiner

Stacked Ultra-Capacitor Cells
in enclosure with electrical contacts

NANOPARTICLE ULTRACAPACITOR

CROSS-REFERENCE TO RELATED APPLICATION

This application claims benefit under 35 U.S.C. §119(e) of U.S. Provisional Application Ser. No. 60/830,583, filed Jul. 14, 2006, the content of which is hereby incorporated by reference in its entirety.

FIELD OF THE INVENTION

The present disclosure relates to a molecular capacitor, and particularly a molecular electrolytic capacitor, and methods of manufacturing the same.

BACKGROUND

Electrical energy storage devices, such as capacitors, batteries, and ultracapacitors, store or create energy by utilizing the electric charge on two metal or otherwise electrically conductive surfaces ("electrodes"). The charge-bearing surfaces are typically separated by an electrical insulator, or dielectric. As charge is placed on the conductive surfaces, an electrical field is established between the electrodes, resulting in a voltage. Typically, a capacitor physically separates positive and negative charges, rather than chemically separating the charges, as is common in batteries. Batteries have limited ability to be recycled and cannot deliver energy as quickly as a capacitor, or without greater losses than occurs with capacitors.

A supercapacitor or ultracapacitor is sometimes called a double-layer capacitor, as it polarizes an electrolytic solution to store energy electrostatically. The energy storage mechanism of an ultracapacitor is highly reversible, which allows for the ultracapacitor to be charged and discharged many times.

Since one property of an ultracapacitor's capacitance, or energy storage ability, depends on the surface area of the electrodes, some ultracapacitors in use today utilize loose carbon powder or other sintered metal powder to try to increase the surface area of the electrodes. However, the carbon powder tends to accumulate at specific points on the electrodes, rather than stay more evenly dispersed throughout the surface area of the electrode. Furthermore, there is an intrinsic limit to the porosity of these materials, and a limit to the amount of surface area that can be attained simply by making smaller and smaller particles. Thus, there exists a need for increasing the capacitance of capacitors, particularly supercapacitors or ultracapacitors. The present invention fulfills this need, and others.

SUMMARY OF THE INVENTION

Figure 1:
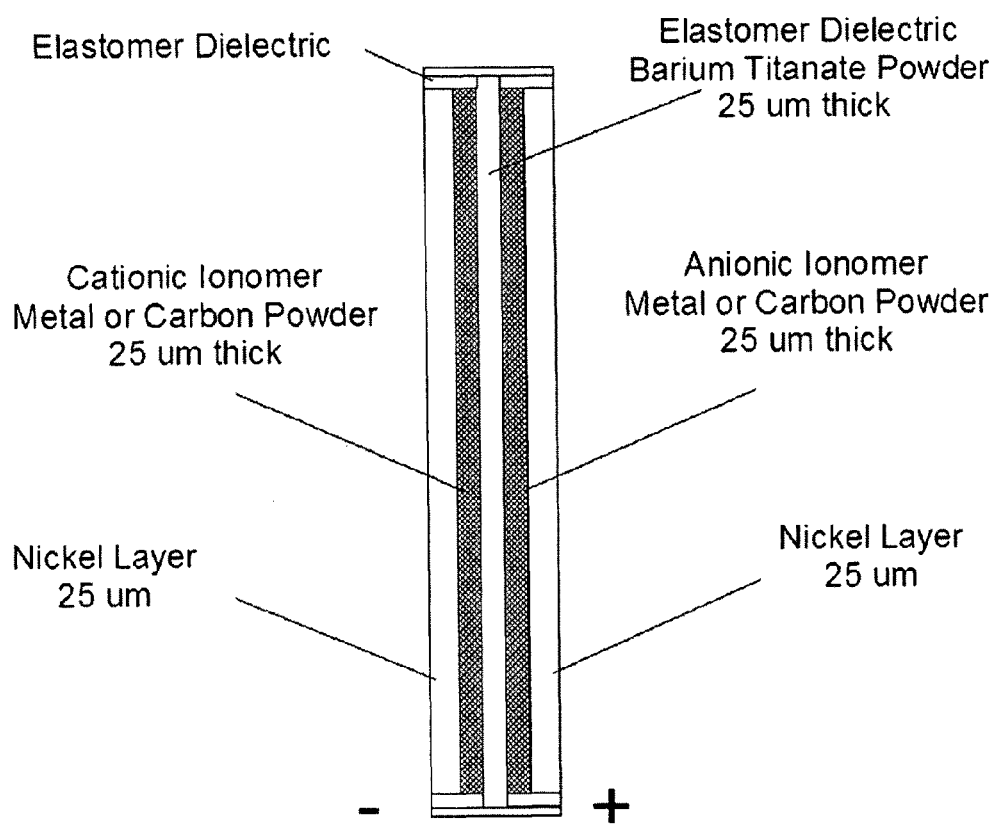
FIG. 1 shows, according to a particular exemplary embodiment, a cross-sectional view of a capacitor.
Figure 2:
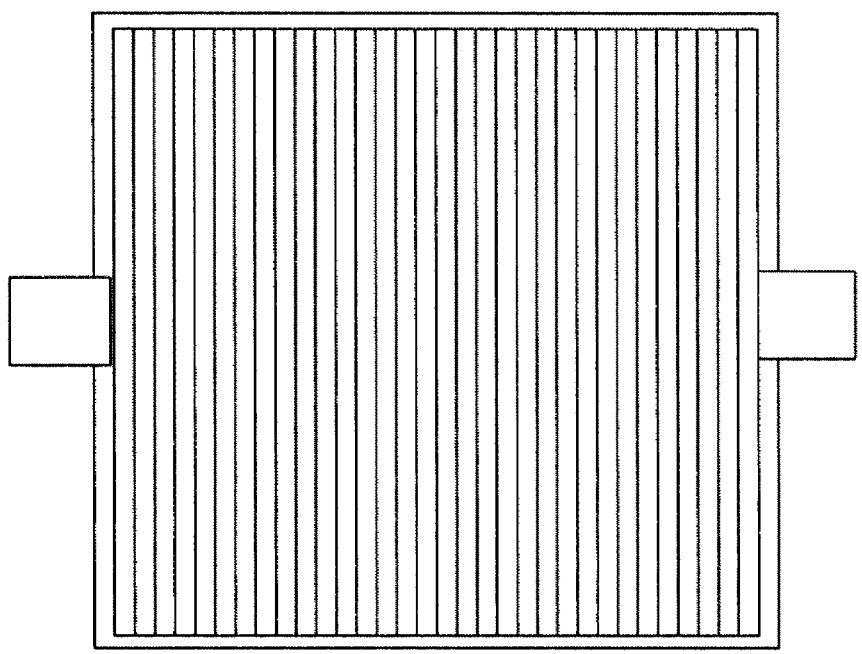
FIG. 2 shows, according to a particular exemplary embodiment, a cross-sectional view of an ultracapacitor with multiple stacked cells.

Particular aspects provide an energy storage device or capacitor, comprising at least three layers that are sealed in a fluid-tight covering, wherein a first layer comprises at least one electrolytic polymer molecule of positive charge and at least one nanoparticle; a second dielectric layer comprising at least one insulative polymer; a third layer comprising at least one electrolytic polymer molecule of negative charge and at least one nanoparticle. In certain embodiments, the electrolytic polymer of the first layer comprises at least one high charge density polymer electrolyte of positive charge, and wherein the electrolytic polymer of the third layer comprises at least one high charge density polymer electrolyte of negative charge. In particular aspects, the nanoparticles comprise electrically conductive nanoparticles. In certain embodiments, the electrically conductive nanoparticles comprise at least one component selected from the group consisting of nickel, carbon, titanium dioxide, lead, lithium, silver, copper, phthalocyanine oligomers, electrically conductive molecules and electrically conductive particles. In certain aspects, the at least one nanoparticle of at least one layer comprises carbon. In certain embodiments, the second, dielectric layer comprises barium titanate. In particular aspects, the second, dielectric layer further comprises at least one nanoparticle. In particular aspects, the second, dielectric layer comprises a mixture of cationic and anionic exchange molecules or electrolytic polymers mixed with a metal oxide. In particular aspects, the second, dielectric layer comprises at least one nanoparticle coated with at least one polymer electrolyte. In certain embodiments, the metal oxide comprises at least one component selected from the group consisting of barium titanate, lead titanate, ceramic, lead zirconate titanate (PZT), strontium titanate, tantalum, diamond, and ionic solids. In certain embodiments, the polymer electrolyte of positive charge or the polymer electrolyte of negative charge, in each case comprising an electrode of the device or capacitor, is suitable to provide a milli-equivalent level of greater than about 2.5, or greater than about 5. In particular embodiments, the at least one nanoparticle of the first layer or of the third layer is loaded with the respective electrolytic polymer to a level greater than about 35% by weight, or greater than about 50% by weight. In certain aspects, the diameter of the at least one nanoparticle of the first layer or of the third layer is about 120 nm, about 100 nm, about 50 nm, about 25 nm, about 15 nm, about 10 nm, about 5 nm, or less. In particular implementations, the fluid-tight covering comprises at least one metal selected from the group consisting of aluminum, copper, and nickel. In certain aspects, the thickness of the covering is selected from the group consisting of about 2 μm, about 5 μm, about 10 μm, about 20 μm, about 25 μm, and about 30 μm. In particular implementations, the device is capable of withstanding voltages greater than about 200 volts, greater than about 500 volts; greater than about 1000 volts, or any voltage value therebetween. In certain embodiments, the device is capable of storing energy at a density of greater than 18,000 joules/12.5 cm$^3$.

In certain aspects the storage device or capacitor comprises a polar or non-polar parallel group of multiple cells forming a cell pack. In particular embodiments, the storage device or capacitor comprises a non-polar parallel group of multiple cells. In particular embodiments, the storage device or capacitor comprises a prismatic non-polar parallel group of multiple cells, and further comprises at least one busbar for connecting a plurality of cells together.

Additional aspects provide a method of manufacturing a storage device or capacitor, comprising sealing, within a fluid-tight covering, at least three layers, wherein a first layer comprises at least one electrolytic polymer molecule of positive charge and at least one nanoparticle; a second dielectric layer comprising at least one insulative polymer; a third layer comprising at least one electrolytic polymer molecule of negative charge and at least one nanoparticle. In certain aspects, sealing comprises sealing a polar or non-polar parallel group of multiple cells forming a cell pack. In particular embodiments, sealing comprises sealing a non-polar parallel group of multiple cells. In particular embodiments, sealing comprises sealing a prismatic non-polar parallel group of multiple cells.

DETAILED DESCRIPTION

The instant disclosure relates to capacitors, particularly ultracapacitors, that may be used for specific applications, for example in electronics (e.g. circuit boards), in pacemakers, in artificial muscles, in hybrid vehicles, gate dielectrics, electronic memories, power storage devices, microwave communications devices, microelectromechanical systems, and other applications.

The physical parameters of a capacitor are generally described by two equations:

$$\text{Charge} = \text{Capacitance} \times \text{Voltage};$$

and $$\text{Capacitance} = \frac{(\text{Permittivity of the dielectric} \times A)}{d}$$

where A is the surface area of the electrodes, and d is the space between them. Thus, in order to maximize the capacitance, the electrode surface area must be increased and electrode separation must be minimized.

In certain embodiments, the ultracapacitor of the instant disclosure provides about 20 milli-farad per ¼ square inch, about 30-milli-farad per ¼ square inch, or about 40 milli-farad per ¼ square inch with 175 micron electrode separation.

Certain embodiments of the present invention include one or more hermetically sealed cell(s) with each cell comprising 3 to 7 layers. The hermetic seal is capable of providing a fluid-tight seal. As used herein, "fluid" refers to liquid and/or gas and/or vapor. The sealed cells can be stacked or adhered to each other by virtue of the molecules, and without gaps between the layers. This design allows for isolation of failed cells. Additionally, the cells have a higher breakdown voltage than other standard capacitors. In certain embodiments, the ultracapacitors have a breakdown voltage of greater than about 15 volts, greater than about 20 volts, greater than about 30 volts, greater than about 40 volts, greater than about 50 volts, greater than about 60 volts, or any value therebetween.

Permittivity of the dielectric is usually expressed as (charge in Coulomb)$^2$/energy in Joules)/length in meters. The permittivity of free space is approximately $8.8542 \times 10^{-2}$ C$^2$/J/ meter. The dielectric permittivity of particular embodiments disclosed herein is approximately $1 \times 10^5$, approximately $2 \times 10^5$, approximately $3 \times 10^5$, approximately $4 \times 10^5$, approximately $5 \times 10^5$, approximately $6 \times 10^5$, approximately $7 \times 10^5$, or any value greater or therebetween, when compared to the permittivity of free space. This increased permittivity allows for storage of more charge for a given voltage, and/or without developing a short circuit for the stored voltage.

Certain embodiments of the present invention relate to capacitors which have the ability to store greater amounts of energy and retain greater quantities of energy than existing capacitors. In addition, certain embodiments of the disclosed capacitor also possesses the ability to be cycled numerous times.

Certain particular components of exemplary embodiments include molecules, such as polymeric electrolytes, that afford increased capacitance. Certain embodiments relate to a high voltage, high charge density polymer electrolyte based electrostatic capacitor based on a double-layer electronic effect.

Certain embodiments of the instant disclosure relate to ultracapacitors with increased capacitance. One way in which the capacitance of an ultracapacitor can be increased is by improving the insulative ability of the dielectric, since charge can be added to the electrodes until the electric field generated between the electrodes becomes so strong that it breaks down the dielectric. The typical measure of dielectric's performance is its permittivity, or its capacitance per unit length. The higher the permittivity, then, the higher the sustainable electric field.

Another way of increasing an ultracapacitor's capacitance is by increasing the surface area of the electrodes. Certain capacitors used today utilize carbon particles to increase the surface area of the electrodes. However, it is difficult to contain the carbon particles, even when using specialized containers. The specialized holding containers also restrict the form and size of the capacitor. Furthermore, the containers waste volume, reducing the available electrode surface and/or area between the electrodes and dielectric, which will decrease the amount of charge the capacitor can accept.

DESCRIPTION OF EXEMPLARY EMBODIMENTS

As illustrated in FIG. 1, one particular exemplary embodiment of a capacitor of the instant disclosure utilizes at least one layer comprising a mixture or suspension of nanoparticles and/or molecules in a layer. Preferably, the layer comprises a molecule, and more preferably a modified polymer (such as by addition, chloromethylation/amination, or sulfonation), and/or a metal or metal alloy. Certain embodiments may further comprise nanoparticles. The particular embodiment illustrated in FIG. 1 also utilizes at least one dielectric layer, preferably comprising a metal oxide and/or nanoparticles. In certain embodiments, the metal oxide preferably comprises barium titanate.

In certain embodiments, the multi-layer capacitor cell is approximately 0.002 inches, approximately 0.003 inches, approximately 0.004 inches, approximately 0.005 inches, approximately 0.006 inches, approximately 0.007 inches, approximately 0.008 inches, approximately 0.009 inches, or any value therebetween or less in thickness.

As illustrated in FIG. 1, in certain exemplary embodiments, the capacitor cell comprises at least four layers. In one particular exemplary embodiment, the outermost layer surrounding the cell comprises a metal or metal alloy to distribute charge in and out of the particular cell, as well as to form a fluid-tight (gas-tight and/or liquid-tight) seal. Metals or metal alloys that may be used for this particular layer include, but are not limited to, nickel, copper, chromium, aluminum, lead, cobalt, silver, gold, cadmium, and alloys of these or other metals. In one preferred embodiment, the outermost layer comprises nickel metal foil.

As indicated in FIG. 1, the second layer, or negative electrode, preferably comprises a thin sheet of a cationic exchange molecule alone or mixed with electrically conductive nanoparticles (e.g. metal nanoparticles), which allows for greater surface area and higher permittivity. In certain embodiments, the negative electrode comprises a molecule containing a positive free ion covalently bonded to the molecule.

In certain embodiments, the electrically conductive nanoparticles comprise nickel, carbon, titanium dioxide, lead, lithium, silver, copper phthalocyanine oligomers, electrically conductive molecules (e.g. a conductive polymer), or other conductive particles.

As illustrated in FIG. 1, the third and center layer of this particular exemplary embodiment, or dielectric layer, comprises a mixture of cationic and anionic exchange molecules (e.g. electrolytic polymers) mixed with a metal oxide, such as barium titanate, lead titanate, ceramic, lead zirconate titanate (PZT), strontium titanate, tantalum, diamond, ionic solids, or other insulative materials. Optionally, nanoparticles may be included in the dielectric layer that may further be coated with at least one molecule. The dielectric can have any permittivity that allows for the desired results when employing the electrodes described herein.

As indicated in FIG. 1, the fourth layer of this particular exemplary embodiment, or the positive electrode, is comprised of a thin sheet of anionic exchange molecules (e.g. polymers) mixed with nickel, carbon, lead, lithium, or other electrically conductive molecules. In certain embodiments, the positive electrode comprises a molecule containing a negative free ion covalently bonded to the molecule. The mixture described allows for greater surface area, and high-level permittivity.

In this invention the polymer employed in each layer of the capacitor may be the same, different or contain a combination of polymers or composite polymers which is the same as or varies from all or any polymer or polymer composite used in the other layers. The sole requirement is that the polymer or polymer composite functions as required for its purpose within the capacitor and not inhibit the functionality of any other part or function of the capacitor. Finally, each selection must be balanced as to charge.

Without wishing to be bound by any particular theory, in certain embodiments, each electrode utilizes a molecule or polymer electrolyte that has the opposite charge free ion associated with it (positive electrode for negative molecule, etc.), according to the free ion spacing within the molecule charge pairs that are driven by the electric field in the capacitor. Thus, as the electric field increases, the free ion spacing grows larger and larger until the field strength is strong enough to ionize the polymer by removing the free ion entirely. Certain molecules (including polymer electrolytes) are believed to be polarizable, such that as the electric field strength increases, the charge pairs orient themselves to oppose the electric field modulating it (reducing in intensity and decreasing capacitor voltage). In order to accomplish this orientation, the surrounding molecules or polymers must be displaced, which creates stored energy. Subsequently, as the charge on the capacitor is reduced, the polymer will relax, releasing the stored energy. This results in a non-linear charging profile for the capacitor cell.

Membranes

As described herein, the capacitors of the instant disclosure utilize layered components, preferably comprising at least one molecule that has been modified by, for example, sulfonation or addition. In the case of sulfonated molecules, the molecules are preferably highly uniformly sulfonated (i.e. from about 60-100% sulfonated by weight), and may be utilized in the form of a sulfonated sheet or membrane. Processes for sulfonating polymers are known in the art (Gilbert, Chem. Rev. 62: 549-589 (1962); German Patent No. DE 580, 366).

In the case of sulfonation, preferred molecules are polymers with a high styrenic content or from a controlled distribution of carbon double bonds, or a highly sulfonated polymer composite.

In certain embodiments, the molecules selected for use in the cationic and/or anionic electrodes or the dielectric, depending on the desired goal, the charge of the particular molecule, other components present in the capacitor, and other factors, are selected from the group consisting of: a nucleic acid, an amino acid, a peptide, a polypeptide, a protein, a glycoprotein, a biopolymer, an oligomer, a polymer, a polyelectrolyte, and a copolymer. In certain embodiments, the molecule comprises a statistical, random, or block copolymer, oligomer, or polymer or any combination thereof. In still other embodiments, the molecule comprises a multiphase large copolymer, oligomer, or polymer, or any combination thereof. In certain embodiments, the molecule comprises an ionomer.

In general, ionomers contain both polar and non-polar moieties, which each group together. The polar ionic moieties tend to cluster together and separate from the nonpolar backbone moieties, which allows for thermoplasticity, especially when heated. This increased thermoplasticity allows for increased energy storage and increased ability to cycle. Additionally, the non-ionic areas can exhibit adhesive properties. In certain embodiments, a balance between thermoplasticity and flow at a certain temperature will be desirable.

In certain embodiments, the molecule has a molecular weight of between approximately 100 grams/mole to approximately 500 grams/mole and contains at least one alkene or arene moiety. In other particular embodiments, the molecule further comprises at least one moiety selected from the group consisting of: arene-containing linear side chains, non-arene-containing linear side chains, saturated linear side chains, unsaturated linear side chains, and flexible hydrocarbon linear side chains. In still other embodiments, the molecule comprises at least one monomeric unit selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly(methyl methacrylate) (PMMA), acrylonitrile butadiene styrene (ABS), polyamide (PA), polyurethane, polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), and polyethylene terephthalate (PET or PETE).

In certain embodiments, the oligomer and/or polymer and/or co-polymer comprises a multiphase large molecular chain molecule. In some embodiments the multiphase large molecular chain oligomers and/or polymers and/or copolymers comprise one or more arene-containing linear side chains, non-arene-containing linear side chains, saturated linear side chains, unsaturated linear side chains, or flexible hydrocarbon linear side chains. Molecules comprised of hydrocarbons, oxygen, nitrogen, or inorganic compounds is thus possible. In preferable embodiments, the molecule has a high styrenic content or a controlled distribution of carbon double bonds, is capable of being dissolved in chlorinated solvents, and stays in solution at cold temperatures.

For purposes of this invention, an "alkene moiety" refers to a hydrocarbon chain containing at least one carbon-carbon double bond. An "arene moiety" refers to a monovalent or divalent aryl or heteroaryl group. An aryl group refers to hydrocarbon ring system comprising hydrogen, 6 to 18 carbon atoms and at least one aromatic ring. For purposes of this invention, the aryl group may be a monocyclic, bicyclic, tricyclic or tetracyclic ring system, which may included fused or bridged ring systems. Aryl groups include, but are not limited to, aryl groups derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pyrene, and triphenylene. Preferably, an aryl group is derived from benzene. A heteroaryl group refers to a 5- to 14-membered ring system comprising hydrogen atoms, one to thirteen carbon atoms, one to six heteroatoms selected from the group consisting of nitrogen, oxygen and sulfur, and at least one aromatic ring. For purposes of this invention, the heteroaryl group may be a monocyclic, bicyclic, tricyclic or tetracyclic ring system, which may include fused or bridged ring systems; and the nitrogen, carbon or sulfur atoms in the heteroaryl radical may be optionally oxidized; the nitrogen atom may be optionally quaternized. Examples include, but are not limited to, azepinyl, acridinyl, benzimidazolyl, benzindolyl, 1,3-benzodioxolyl, benzofuranyl, benzooxazolyl, benzothiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, isoindolinyl, isoquinolyl, indolizinyl, isoxazolyl, 5,8-methano-5,6,7,8-tetrahydroquinazolinyl, naphthyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, quinuclidinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl, and thiophenyl (i.e. thienyl).

For purposes of this invention, an "arene-containing linear side chain" refers to an unbranched hydrocarbon chain consisting only of hydrogen or carbon, wherein at least one carbon in the chain is replaced with an aryl or heteroaryl group, as defined above.

For purposes of this invention, a "non-arene-containing linear side chain" refers to an unbranched hydrocarbon chain consisting only of hydrogen or carbon and containing no aryl or heteroaryl groups within the chain.

For purposes of this invention, a "saturated linear side chain" refers to an unbranched hydrocarbon chain consisting only of hydrogen or carbon comprising at least one carbon-carbon double bond or at least one carbon-carbon triple bond. An "unsaturated linear side chain," as used herein, generally refers to an unbranched hydrocarbon chain consisting only of hydrogen or carbon containing no carbon-carbon double bonds and no carbon-carbon triple bonds.

For purposes of this invention, a "flexible hydrocarbon linear side chain" refers to a flexible connecting component as taught by U.S. Pat. Nos. 5,468,574 and 5,679,482, of which the disclosures of both are hereby incorporated by reference in their entireties.

Various types of copolymers, including block copolymers, exist that may be used with certain embodiments disclosed herein. For example, alternating copolymers comprise regular alternating A and B chemical or constitutional units; periodic copolymers contain A and B units arranged in a repeating sequence (e.g. $(A\text{-}B\text{-}A\text{-}B\text{-}B\text{-}A\text{-}A\text{-}A\text{-}B\text{-}B)_n$); random copolymers comprise random sequences of monomer A and B units; statistical copolymers comprise an ordering of distinct monomers within the polymer sequence that obeys statistical rules; block copolymers that are comprised of two or more homopolymer subunits linked by covalent bonds and may be diblock, tri-block, tetra-block or multi-block copolymers. (IUPAC, *Pure Appl. Chem.*, 68: 2287-2311 (1996)).

Additionally, any of the copolymers described may be linear (comprising a single main chain), or branched (comprising a single main chain with one or more polymeric side chains). Branched copolymers that have side chains that are structurally distinct from the main chain are known as graft copolymers. Individual chains of a graft copolymer may be homopolymers or copolymers, and different copolymer sequencing is sufficient to define a structural difference. For example, an A-B diblock copolymer with A-B alternating copolymer side chains is considered a graft copolymer. Other types of branched copolymers include star, brush and comb copolymers. Any one of these copolymers, or any mixture thereof, may be utilized with certain aspects of the disclosed capacitor.

In certain embodiments disclosed herein, the molecule utilized comprises a polymer comprised of at least one block. In certain embodiments, the molecule is a thermoplastic block copolymer. In other embodiments, the molecule is a block copolymer that comprises differentiable monomeric units. Preferably, at least one of the monomeric units of the block copolymer comprises an arene moiety-containing unit. In other preferred embodiments, at least one block comprises a non-arene moiety-containing unit. In certain embodiments, the block copolymer comprises at least two monomeric units arranged in statistically random order. In other embodiments, the block copolymer comprises at least two monomeric units arranged in ordered sequence. In certain embodiments, the molecule utilized in the processes disclosed herein includes not only polymers or block copolymers, but also copolymers with other ethylenically unsaturated monomers (such as acrylonitrile, butadiene, methyl methacrylate, etc.).

In certain embodiments disclosed herein, a block copolymer refers to a block copolymer having at least a first block of one or more mono alkene-arene moiety, such as styrene, ring-substituted styrene, α-substituted styrene, and any combination thereof; and a second block of a controlled distribution copolymer of a diene moiety and a mono alkene-arene moiety. The block copolymer can be any configuration of "A" and "B" blocks, and such block copolymers can be generated by methods known in the art.

For purposes of this invention, a "mono alkene-arene moiety" refers to one or more alkene moieties, as defined above, covalently bonded to an arene moiety, as defined above. An example of a "mono alkene-arene moiety" is styrene. A "poly alkene-arene moiety" refers to a two or more mono alkene-arene moieties, as defined above, covalently bonded to each other to form a chain comprising two or more mono alkene-arene moieties. An example of a "poly alkene-arene moiety" is polystyrene. A "diene moiety" refers to a hydrocarbon chain containing two carbon-carbon double bonds. In certain embodiments, the diene moiety may be conjugated, unconjugated, or cumulated.

Some specific examples of block copolymers include those described in U.S. Pat. Nos. 4,248,821; 5,239,010; 6,699,941; 7,186,779; 7,169,850; 7,169,848; 7,067,589; 7,001,950 and 6,699,941 and U.S. Patent Application Publication Nos. 20070021569; 20050154144; 20070004830; 20070020473; 20070026251; 20070037927; and 20070055015, all of which are hereby incorporated by reference in their entireties.

In certain embodiments, the molecule comprises a statistical copolymer. A statistical copolymer is used herein consistent with the commonly understood usage in the art (see, for example, G. Odian, Principles of Polymerization, 1991). Statistical copolymers are derived from the simultaneous polymerization of two monomers and have a distribution of the two monomeric units along the copolymer chain, which follows Bernoullian (zero-order Markov), or first or second order Markov statistics. The polymerization may be initiated by free radical, anionic, cationic or coordinatively unsaturated (e.g., Ziegler-Natta catalysts) species. According to Ring et al., (Pure Appl. Chem., 57, 1427, 1985), statistical copolymers are the result of elementary processes leading to the formation of a statistical sequence of monomeric units that do not necessarily proceed with equal probability.

These processes can lead to various types of sequence distributions comprising those in which the arrangement of monomeric units tends toward alternation, tends toward clustering of like units, or exhibits no ordering tendency at all. Bernoullian statistics is essentially the statistics of coin tossing; copolymers formed via Bernoullian processes have the two monomers distributed randomly and are referred to as random polymers. For example, it is possible in a free radical copolymerization for the active end, in the case of one embodiment, a styryl or butadienyl radical, to have essentially no selectivity for styrene vs. butadiene. If so, the statistics will be Bernoullian, and the copolymer obtained will be random. More often than not, there will be a tendency for the propagating chain end to have some selectivity for one monomer or the other. In some cases block copolymers can be derived from the simultaneous copolymerization of two monomers when the preference of the propagating chain ends for adding the opposite monomers is very low. The resulting polymer would be categorized as a block copolymer for the purposes of the present invention.

Statistical copolymers generally display a single glass transition temperature. Block and graft copolymers typically display multiple glass transitions, due to the presence of multiple phases. Statistical copolymers are, therefore, distinguishable from block and graft copolymers on this basis. The single glass transition temperature reflects homogeneity at the molecular level. An additional consequence of this homogeneity is that statistical copolymers, such as those of styrene and butadiene, when viewed by electron microscopy, display a single phase morphology with no microphase separation. By contrast, block and graft copolymers of styrene/butadiene, for example, are characterized by two glass transition temperatures and separation into styrene-rich domains and butadiene-rich domains. It should be noted that membranes of the invention which are produced from statistical copolymers originally having a single glass transition temperature and a single phase morphology do not necessarily exhibit a single phase morphology or a single glass transition temperature after sulfonation because of chemical changes in the polymer effected by the sulfonation, in combination with the physical changes effected by the casting processes of the invention.

Pseudo-random copolymers are a subclass of statistical copolymers which result from a weighted change in the monomer incorporation that skews the distribution from a random arrangement (i.e. Bernoullian) is defined as statistical. Linear arrangements have been described here, but branched or grafted including star arrangements of monomers are possible as well. In addition, block copolymers of styrene and hydrogenated butadiene, isoprene, or equivalent olefin can be employed. The block architecture can be monomeric units comprising diblock, triblock, graft-block, multi-arm starblock, multiblock, segmented, tapered block, or any combination thereof.

In certain such embodiments, the polymer includes moieties or segments comprising unsaturated carbon-carbon double bonds, which are able to be sulfonated. Some examples of such polymers include, but are not limited to polybutadiene or polyisoprene.

In particular, certain embodiments disclosed herein relate to the sulfonation of molecules comprising one or more of the following moieties: alkane, alkene, alkyne, and arene, each of which may be optionally substituted by one or more of the following functional groups: carboxylic acid, urea, ester, urethane (carbamate), alkene, amide, benzene, pyridine, indole, carbonate, thioester, arcylate/acrylic, ether, amidine, ethyl, acid versions of aliphatic compounds that contain alkenes, alkanes or alkynes, imidazole, oxazole, and other possible combinations of heteroatom containing groups susceptible to loss of water and/or disassembly. Each of the terms listed above has its standard definition known to one skilled in the art.

The weight of the molecules utilized in the instant invention are preferably at least approximately 1 kilo Dalton (KD), 2 KD, 5 KD, 10 KD, 15 KD, 20 KD, 25 KD, 30 KD, 40 KD, 50 KD, 60 KD, 70 KD, 80 KD, 90 KD, or any value therebetween or greater.

Some examples of molecules that may be included in certain embodiments include but are not limited to: polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly(methyl methacrylate) (PMMA), acrylonitrile butadiene styrene (ABS), polyamide (PA), polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), and any combination of these or others.

Polymers of various degrees of polymerization are also included in the present invention. As one of skill in the art would readily appreciate, the degree of polymerization generally refers to the number of repeat units or segments in an average polymer chain at a particular time in a polymerization reaction, where length is measured by monomer segments or units. Preferable lengths include, but are not limited to, approximately 500 monomer units, 1000 monomer units, 5000 monomer units, 10,000 monomer units, 25,000 monomer units, 50,000 monomer units, 100,000 monomer units, 200,000 monomer units, 300,000 monomer units, 500,000 monomer units, 700,000 monomer units, or greater or any value there between.

The degree of polymerization may also be a measure of the polymer's molecular weight. Thus, the degree of polymerization is equal to the total molecular weight of the polymer divided by the total molecular weight of the repeating unit or segment. Polymers with different total molecular weights but identical composition may exhibit different physical properties. Generally, the greater the degree of polymerization correlates with the greater melting temperature and greater mechanical strength.

In certain embodiments, the oligomer and/or polymer and/or co-polymer comprises a multiphase large molecular chain molecule. In some embodiments the multiphase large molecular chain oligomers and/or polymers and/or copolymers comprise one or more arene-containing linear side chains, non-arene-containing linear side chains, saturated linear side chains, unsaturated linear side chains, or flexible hydrocarbon linear side chains.

Nanoparticles and Electrodes

The nanoparticles of the instant invention may be utilized in the capacitor cells in the form of a powder, gel, suspension, emulsion, sol, solid, liquid or gas. The nanoparticles may also be utilized in a non-liquid form. In certain embodiments, the capacitor has no liquid component.

Certain capacitor embodiments disclosed herein utilize nanoparticles to increase the surface area of the electrodes, and/or dielectric components, and/or utilize molecules, such as electrolytic polymers for charge storage, as well as other molecules, such as insulative polymers, as a component in a dielectric. In certain embodiments, the diameter of the nanoparticles is about 150 nm, about 125 nm, about 100 nm, about 75 nm, about 50 nm, about 25 nm, about 10 nm, about 5 nm, about 2.5 nm, about 2 nm, about 1 nm, or less, or any value therebetween.

Certain other embodiments disclosed herein include flat sheets of the nanoparticle and electrolytic molecule (e.g. polymer) capacitor materials to form capacitor cells. The flat sheets of very thin cells forming the capacitor, allows for versatility of shape and size of the capacitor. In addition, the flat cells will allow the for the use of prismatic, or other shapes for the capacitors to generate ultracapacitors that are efficient in space and volume.

In particular exemplary embodiments, the thin, flat sheets are laminated together to form a capacitor cell. The particular processes of forming the materials and assembling the cells allow for high speed automation, thus reducing the overall cost of manufacturing the capacitors. In certain exemplary embodiments, the sheet material capacitors are stacked in a prismatic, or other arrangement, that allows for generation of ultra-capacitor devices having the typically ability to cycle and re-cycle, good power delivery, and energy storage ranging from approximately 200 watt-hour/liter, approximately 300 watt-hour/liter, approximately 400 watt-hour/liter, approximately 500 watt-hour/liter, approximately 200 watt-hour/kg, approximately 300 watt-hour/kg, approximately 400 watt-hour/kg, approximately 500 watt-hour/kg, or any value therebetween or greater.

In certain embodiments, the nanoparticles are applied to the face of the electrode by casting, vapor depositing, spraying, or any other process that allows for uniform application. Once attached to the face of the outer metal layer, the nanoparticles increase the functional surface area, thus increasing the capacitance of the capacitor. In certain embodiments, the surface area can be increased as much as about 100 times, about 500 times, about 1,000 times, about 10,000 times, about 50,000 times, about 100,000 times, or more or any value therebetween.

One particular example of a general composite electrode is set forth in U.S. Pat. No. 5,136,474, the entire contents of which are hereby incorporated by reference.

In certain embodiments, one electrode comprises electrically conductive nanoparticles and at least one anionic, high charge density molecule (such as an electrolyte polymer or composite), and the other electrode comprises at least one cationic, high charge density molecule (such as an electrolyte polymer or composite). In certain embodiments, the electrode bearing the negative charge for the capacitor comprises a cationic exchange polymer (which is a polymer containing a positive free ion electrostatically bound to the negative ion of the polymer electrolyte). By comparison, the electrode bearing the positive charge comprises an anionic exchange polymer containing a negative free ion electrostatically bound to a positive ion of the polymer electrolyte or polymer composite.

The molecules selected for particular embodiments act to hold the nanoparticles of the electrode together. In certain embodiments, the molecules act as an adhesive to bind the conductive particle electrode to the interior face of the outer layer (e.g. metal foil). The molecules may also serve as a dielectric function by modulating the electric field at the surface of the nanoparticles, increasing the charge capacity of the electrode and the cell. The molecules may also fill a void between the particles, preventing any voids from creating paths to the dielectric layer.

Molecules

The molecules (e.g. polymer electrolytes) described herein may be utilized in the electrically conductive layers (i.e. the anionic or cationic layers) of the capacitor directly or indirectly. While not themselves conductive, the molecules help to fill in gaps in the electrically conductive materials utilized in the electrodes.

In certain embodiments, the molecules may be directly mixed or suspended with the nanoparticles. In certain other embodiments, the molecules may be indirectly used by being cast onto a webbing, release liner, or other suitable backing, structure, or support for adhering to the face of the electrode. In addition, such webbing or support may be utilized to insulate the cell from loss of electrons or protons, or to provide additional mechanical properties of the electrode. In certain embodiments, certain molecules are electrolytic (i.e. conductive), and other molecules are insulative. One of skill in the art would readily appreciate which molecules are insulative, based on whether or not the particular molecule conducts electricity. In instances where the molecules are conductive, the molecules may be referred to as "conductive molecules."

The nanoparticles utilized by certain exemplary embodiments may be of any shape or form, preferably spheroidal, and can be round, oval, irregular, pyramidal, conical, rhomboidal, or any variation of these or other shapes. The nanoparticles of the instant disclosure can comprise carbon, nickel, lead, lithium, or other electrically conductive molecules. In certain preferred embodiments, the nanoparticles comprise carbon. The choice of nanoparticle material would depend on certain factors, such as the goal of the capacitor cell, the type(s) of conductive molecules used in the electrodes, and the type(s) of materials utilized in the dielectric layer. In certain embodiments, certain molecules disclosed herein may also be adhered to the nanoparticles.

Additionally, the choice of the electrolytic molecule will vary according to the desired ability of the electrolytic molecule to adhere to the nanoparticle, and the desired ability of the nanoparticle to adhere, either through physical or chemical attraction, to the face of the electrode. Thus, in preferred embodiments, the nanoparticle is able to adjust with movement of the dielectric without detaching from the face of the electrode.

The three-dimensional surface of the nanoparticles allows for increased functional surface area upon which the charge may build the electric field within each electrode layer of the capacitor. Further, the nanoparticle suspension or mixture with the conductive molecules reduces the ESR. Thus, the overall capacitance of the cell is increased.

Dielectric

As illustrated in FIG. 1, the third and center layer of this particular exemplary embodiment, or dielectric layer, comprises a mixture of cationic and anionic exchange molecules (e.g. electrolytic polymers) mixed with a metal oxide, such as barium titanate, lead titanate, ceramic, lead zirconate titanate (PZT), strontium titanate, tantalum, diamond, ionic solids, or other insulative materials. The dielectric can have any permittivity that allows for the desired results when employing the electrodes described herein. A capacitor containing a dielectric with a higher permittivity can exhibit a lower intensity electrical field for a given amount of charge than one with a lesser permittivity. This results in a capacitor that can store more energy at a lower voltage than one with a lower dielectric constant or permittivity dielectric. Further, as in the electrodes, the dielectric layer can store energy from the change of free ion spacing and the change of orientation of the polymer free ion covalently bonded ion pair. The free ion spacing and molecule charge pair orientation is reversible, such that the capacitor can store and deliver its energy with every charge and discharge cycle of the capacitor.

In certain preferred embodiments, the cell must be hermetically sealed, and as thin as possible in order to maximize the capacitor's abilities. Depending on the molecule and structure selected, the capacitor can accept and retain charges in excess of about 1.0 volts, about 1.5 volts, about 2.0 volts, about 2.5 volts, about 3.0 volts, about 3.5 volts, or any value therebetween or greater. Additionally, the certain embodiments disclosed herein can create voltages greater than about 50 volts, about 100 volts, about 200 volts, about 1000 volts, about 5000 volts, about 10,000 volts, about 15,000 volts, about 20,000 volts, or greater or any value therebetween.

Without wishing to be bound by any particular theory, the energy storage capacity of certain embodiments depends on the particular molecules selected for use, depending on the desired goals of the capacitor. Thus, the polymer electrolytes preferably respond to the presence or absence of charge on the electrodes. The polymer responds to the charge by varying free ion spacing to the covalently bound polymer charge and by varying the polymer charge pair orientation to the charge derived electric field.

Certain embodiments disclosed herein allow for a high dielectric permittivity with high charge density molecule (such as an electrolytic polymer) that minimizes the electric field, allowing more charge to be stored. Without wishing to be bound by any particular theory, the high dielectric permittivity of certain disclosed embodiments results from the ability of molecules in the dielectric to polarize toward the positive plate, leaving a deficiency of electrons (and thus, positive charge) at the negative plate. This allows for reduction of the overall field, which in turn allows for more electrons to crowd onto the electrodes, thereby increasing the amount of charge that can be held by the capacitor.

Certain embodiments disclosed herein include a dielectric comprising nanoparticles of a metal oxide, such as barium titanate, which is coated or submersed in at least one electrolytic molecule, which maintains a high level of insulative properties and minimizes leakage paths. In addition, the use of conductive molecules in the dielectric, such as high-charge density polyconductive molecules, allows for the dielectric to be extremely thin, minimizing the distance between the positive and negative electrodes. This reduces the internal series resistance of the capacitor, typically known as Equivalent Series Resistance (ESR).

In certain embodiments, the dielectric layer is approximately 1 micron thick, approximately 2 microns thick, approximately 5 microns thick, approximately 10 microns thick, approximately 15 microns thick, approximately 20 microns thick, approximately 25 microns thick, approximately 30 microns thick, approximately 40 microns thick, approximately 50 microns thick, or any value therebetween or less.

The polymer or polymer composites used in the dielectric should permit protons or electrons to adhere to the face to a lesser degree than the polymer or polymer composite used for the Electrodes. Hence, although the same polymer or polymer composite may be used in both instances it is not required and if the same polymer or polymer composite is chosen its attributes must be modified depending on the application for which it is used in the capacitor. Further, when selecting a polymer or polymer composite for the dielectric its should be selected to have a limited thermoplastic flow. If a sulfonated polymer or polymer composite is employed care must be taken not to sulfonate the polymer to such an extent so as to cause pathways or channels capable of transporting ions to form within the resulting polymer. Additionally, the molecule (e.g. polymer) or polymer composite (typically thermoplastic) used in the dielectric should preferably have some molecular chain mobility which allows for use above the polymer's glass transition state temperature. In the instance of a sulfonated polymer, the polymer should preferably not be cross-linked before it is processed into its final form as either a particle coating or a discrete layer.

In particular embodiments, a non-polymeric dielectric may be employed, however it is preferable to coat the dielectric with a polymer or polymeric composite. For example, PET, polyester (such as MYLAR®), or other polymers disclosed herein or in the art may be utilized with the dielectric.

In certain embodiments, the dielectric comprises MYLAR® (polyester), coated in a molecule disclosed herein. In certain embodiments, 0.5 mL weight polyester is preferred. The choice of materials utilized in the dielectric will vary according to a number of factors, including but not limited to the goal of the capacitor, the mechanical attributes of the molecule (e.g. polymer), such as its rigidity, thickness, strength, permittivity, and (in the case where a sulfonated molecule is utilized) the ability to cross-link polymers used in the dielectric in order to decrease the dielectric loss from free sulfonic acid groups. Particular examples of cross-linking a dielectric matrix are known in the art (Yang, et al., *Polymer,* 48, pp. 791-798, 2007, U.S. Pat. No. 6,841,601; U.S. Pat. No. 7,179,860; U.S. Pat. No. 4,468,574; U.S. Pat. No. 5,679,482; U.S. Pat. No. 6,110,616; U.S. Pat. No. 6,383,391, and hereby incorporated by reference in their entireties). In certain embodiments, polyethylene terephthalate (PET) is a preferred molecule utilized in the dielectric layer of the capacitor.

In certain embodiments, at least one molecule (e.g. polymer) may be utilized in the dielectric layer of certain embodiments of the capacitor described herein. In certain embodiments, the molecule may be useful as an additional source of charge for the capacitor. For example, as the electric field forms, the molecule used in the dielectric will bend as it aligns with electrons. The bending or twisting of the molecule results in an additional source of energy. When the charge is removed, the molecule will return to its original form, which allows for discharge and recharge of the capacitor without significant degradation of the dielectric. Therefore, selection of a molecule for use in the dielectric may depend on permittivity, as well as sufficient movement of the molecules within the dielectric layer.

In addition, the shape of the nanoparticles (such as a spheroidal shape) does not completely cover the face of the electrode. The gaps left between the face of the electrode and the nanoparticles allow for movement of the selected molecule, as well.

Preferable molecules used in certain embodiments disclosed herein include short block polymers, rather than large tri-block polymers, that are random polymer, random oligomer, or multi-block polymers.

Sulfonation and/or chloromethylation/amination of molecules, in particular block polymers and co-polymers, is particularly useful for certain embodiments disclosed herein.

Cell Packs

Figure 3:
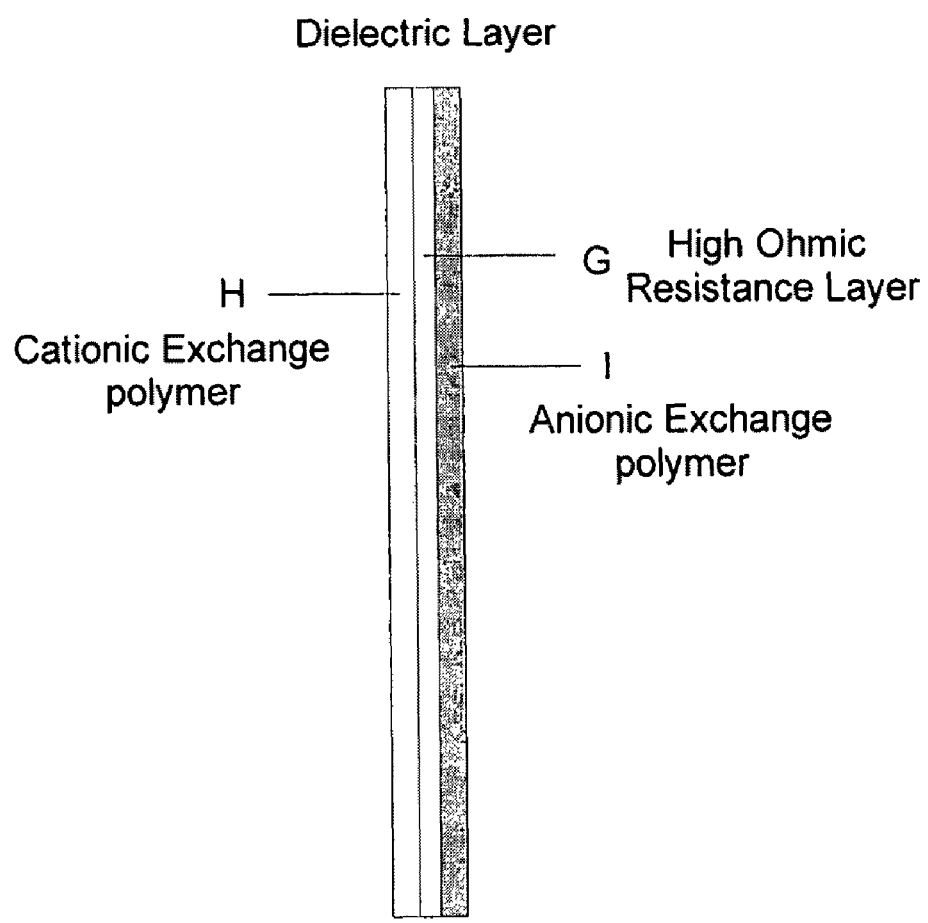
FIG. 3 shows, according to a particular exemplary embodiment, a cross-sectional view of a dielectric layer.

Certain embodiments include a parallel group of multiple cells, which will result in higher power and energy density devices with lower self discharge rates. In addition, simplified construction of multiple cells and multiple cell groups which are referred to herein as a "cell pack" further increase the power and energy density of the ultracapacitor (See, for example, FIG. 3 and FIG. 4).

Presently, using current capacitor technology requires multiple cells to be connected in series if greater voltage is desired. Certain embodiments of the present invention allow for the ability to connect cells in parallel forming a cell pack, thus reducing the current that each cell must supply. The lower, more distributed currents allow higher charging and discharge currents with lower cell resistance. Thus the energy lost to resistance heating will be less than in a serially connected cell system, which results in higher efficiency. Further, the lower cell currents allows for thinner cell layers to be used in the ultracapacitor, which can makes the capacitor lighter weight and reduced cost.

Thus, while the capacitor can be constructed in serial or parallel, there are advantages to connecting the cells in parallel. It can be non-polar or polar. Preferably, in such an instance, the cells are orientated in a non-polar manner as such orientation results in a simplified cell construction and a reduced weight due to the elimination of cell to cell insulating layers. A prismatic parallel cell pack arrangement is shown in the diagram below. The diagram has a busbar connecting the cells together; solid black or colored horizontal line across the top and bottom of the diagram respectively.

Figure 4:
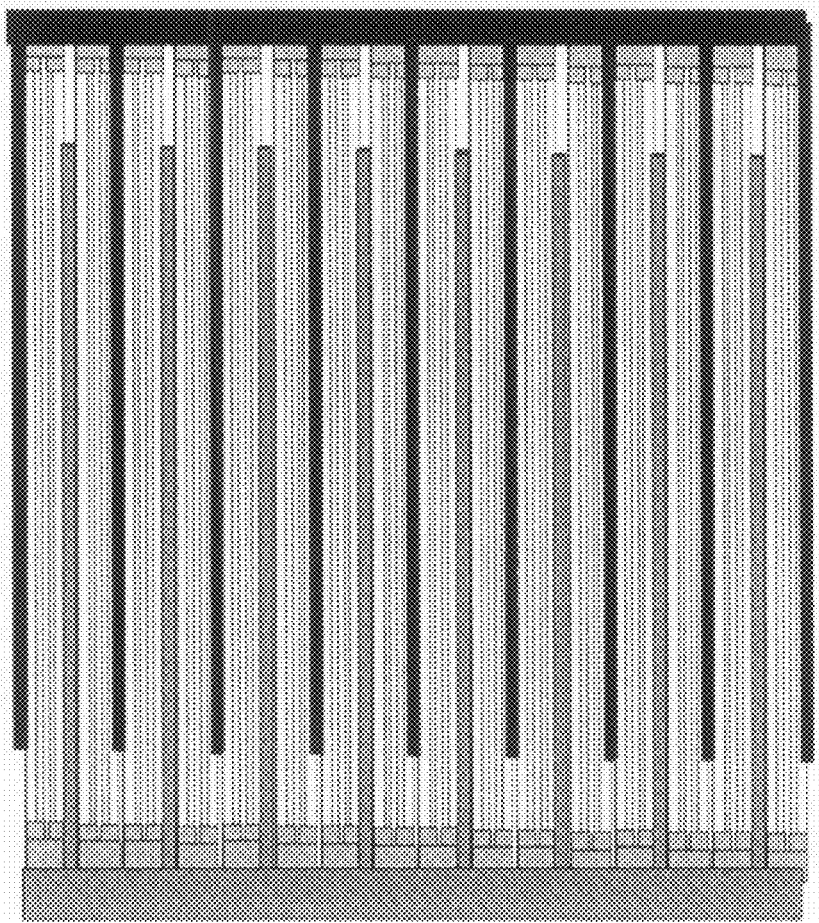
FIG. 4 shows, according to a particular exemplary embodiment, a cross-sectional view of an ultracapacitor with cells connected in parallel.

As illustrated in FIG. 4, a prismatic parallel cell pack arrangement has a busbar connecting the cells together (solid black line across the top and infiltrating to separate the cells). Preferably, the cells are oriented in a non-polar manner such that cell to cell insulating layers are reduced or eliminated, which reduces the weight of the cell pack.

The busbar operates to carry current, and is attached using a variety of suitable methods. The size and shape of the cells along with the design of the busbar is selected to maximize the capacity of the cell pack.

Cell packs of the present invention include packs of any shape or size, including but not limited to spiral, rectangular, square, pyramidal, or any other shape that allows for formation of sufficient charge for the busbar. Thus, heavy cell currents may require the design of the capacitor to be modified, for example, to minimize internal resistance.

Formation of the layers of a cell may be achieved by any existing method for attachment of such materials. Preferably, the capacitor components (electrodes, dielectric, metal sheeting, etc.) are formed into a sheet. All sheets can then be assembled to form a cell. The molecule (e.g. polymer) may be chosen so as to have the ability to hold the layers in place while the cell is manufactured (for example, cut or formed). Some examples of manufacturing cells and cell membranes are described herein. The cell can then be hermetically sealed using any suitable method. Each cell is oriented in a parallel manner and the busbar attached.

Methods of Manufacture

Membranes described in certain embodiments herein may be manufactured as a 'roll-good', cut, and laminated to form the capacitor cells. These cells will be assembled into a prismatic rectangular array to meet a given application's power and energy requirements.

One particularly preferred method for creating the thin layered membranes described herein involves using a mixture of a dilute solution of polymer electrolyte and metal/carbon/barium titanate powder as a spray coat on a nanoparticle substrate. This method produces a low density coating that responds well to the pressurized rolling step, in a rolling process.

In certain other embodiments, the membranes may be produced by spray processing, such as thermal spray coating. Thermal spray processing allows for a relatively thin (approximately 0.005") and thick (approximately 0.250") coatings of polymers onto a variety of materials and is effective to produce protective barriers. Some examples of polymers that have been used for thermal spraying include but are not limited to polyethylene, polymethyl-methacrylate, ethylene-methyl methacrylate copolymer, ethylene methacrylic acid copolymer, polyetheretherketone polymer, polyphenylene sulfide liquid crystal polymer, nylon, phenolic epoxy, Tefzel, and post consumer commingled polymer.

In general, for thermal spraying includes injecting a molecule powder into a heat source (such as a flame or plasma) and moving it to a pre-heated substrate by way of a spray gun or other apparatus. The thickness of the coating depends on the number of passes of the spray gun across the substrate.

In still other embodiments, membranes may be produced by melt extrusion. Generally, melt extrusion involves feeding molecules into a drive extruder as raw plastic material, which transports the material to a die head while it is simultaneously heated, mixed, pressurized and metered. At the die head, the molecule takes up the approximate shape of the article and is then cooled either by water or air to give the final shape. As the molecule cools it is drawn along by haul-off devices and either coiled (for soft products) or cut to length (for hard products).

In addition to the above-mentioned processes, membranes may also be produced by using a rotogravure process or a slot casting process. For a slot casting process, the molecule dissolved in a solvent is pressure extruded in a uniform thickness and viscosity onto carrier or support creating a continuous film. Rotogravure is a process wherein a cylinder with surface cavities is coated with a liquid. As the cylinder turns, it transfers the liquid in the surface cavities to a carrier or support forming a continuous film. The resulting density and cross-sectional thickness are uniform, which produces a strong membrane.

EXAMPLES

The following table indicates specific properties of one particular exemplary embodiment, compared with other capacitors or batteries in use today.

|  | Dais Ultracap (estimated) | Maxwell Ultracap (spec sheet) | EEStor Ultracap | A123 Lithium ion battery |
| --- | --- | --- | --- | --- |
| Energy Density (Wh/L) | 600 | 15 | 700 | 400 |
| Specific Energy Wh/kg | 200 | 4 to 6 | 290 | 150 |
| Self Discharge Rate | 2%/month | 50%/month | 0.02%/month | 2%/month |
| Specific Power W/kg | >1500 | >1500 | $10^6$ | 200-400 |
| ESR | 100 m-Ohm | 65 m-Ohm | 22 u-Ohm | 11 Ohm |
| Storage Temp Range (° C.) | −40 to +125 | −40 to +65 | ?? | −50 to +60 |
| Operating Temp Range (° C.) | −40 to +85 | −40 to +65 | −40 to +85 | −30 to +60 |
| Cyclic Lifetime | >10,000 | >500,000 | >1,000,000 | >1000 |

Thus, preferred embodiments disclosed herein include capacitors of a 5-7 layer structure capable of sustaining voltages in excess of 3 volts per cell with an upper maximum of several thousand volts per cell. Certain preferred embodiments include a capacitor that is composed of composite electrodes constructed from cationic and/or anionic molecules optionally in conjunction with nanoparticles (e.g. carbon nanoparticles). Further, certain preferred embodiments include a dielectric layer comprised of multiple layers of molecules, such as polymer electrolytes high resistivity organic layer(s), and optionally metal oxide nanoparticles in the dielectric layer.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An energy storage device or capacitor, comprising at least three layers that are sealed in a fluid-tight covering, wherein a first layer comprises at least one electrolytic polymer molecule of positive charge and at least one nanoparticle; a second dielectric layer comprising at least one insulative polymer; and a third layer comprising at least one electrolytic polymer molecule of negative charge and at least one nanoparticle, wherein the second, dielectric layer comprises at least one nanoparticle coated with at least one polymer electrolyte.

2. The storage device or capacitor of claim 1, wherein the electrolytic polymer of the first layer comprises at least one high charge density polymer electrolyte of positive charge, and wherein the electrolytic polymer of the third layer comprises at least one high charge density polymer electrolyte of negative charge.

3. The storage device or capacitor of claim 1, wherein the nanoparticles in the first and third layers comprise electrically conductive nanoparticles.

4. The storage device or capacitor of claim 3, wherein the electrically conductive nanoparticles comprise at least one selected from the group consisting of nickel, carbon, titanium dioxide, lead, lithium, silver, copper, phtahlocyanine oligomers, electrically conductive molecules and electrically conductive particles.

5. The storage device or capacitor of claim 1, wherein the nanoparticle of at least the first or third layer comprises carbon.

6. The storage device or capacitor of claim 1, wherein the second, dielectric layer further comprises barium titanate.

7. The storage device or capacitor of claim 1, wherein the second, dielectric layer further comprises a mixture of cationic and anionic exchange molecules or electrolytic polymers mixed with a metal oxide.

8. The storage device or capacitor of claim 7, wherein the metal oxide comprises at least one selected from the group consisting of barium titanate, lead titanate, ceramic, lead zirconate titanate (PZT), strontium titanate, tantalum, diamond, and ionic solids.

9. The storage device or capacitor of claim 1, wherein the polymer electrolyte of positive charge or the polymer electrolyte of negative charge, in each case comprising an electrode of the device or capacitor, will have a milli-equivalent level of greater than about 2.5.

10. The storage device or capacitor of claim 1, wherein the at least one nanoparticle of the first layer or of the third layer is loaded with the respective electrolytic polymer to a level greater than about 35% by weight.

11. The storage device or capacitor of claim 1, wherein the diameter of the at least one nanoparticle of the first layer or of the third layer is about 120 nm or less.

12. The storage device or capacitor of claim 1, wherein the fluid-tight covering comprises at least one metal selected from the group consisting of aluminum, copper, and nickel.

13. The storage device or capacitor of claim 1, wherein the thickness of the covering is selected from the group consisting of about 2 μm, about 5 μm, about 10 μm, about 20 μm, about 25 μm, and about 30 μm.

14. The storage device or capacitor of claim 1, wherein the device is capable of withstanding voltages greater than about 200 volts.

15. The storage device or capacitor of claim 1, wherein the device is capable of storing energy at a density of greater than 18,000 joules/12.5 $cm^3$.

16. The storage device or capacitor of claim 1, comprising a polar or non-polar parallel group of multiple cells forming a cell pack.

17. The storage device or capacitor of claim 16, comprising a non-polar parallel group of multiple cells.

18. The storage device or capacitor of claim 16, comprising a prismatic non-polar parallel group of multiple cells, and further comprising at least one busbar for connecting a plurality of cells together.

19. The method of claim 16, wherein sealing comprises sealing a prismatic non-polar parallel group of multiple cells.

20. A method of manufacturing a storage device or capacitor, comprising sealing, within a fluid-tight covering, at least three layers, wherein a first layer comprises at least one electrolytic polymer molecule of positive charge and at least one nanoparticle; a second dielectric layer comprising at least one insulative polymer; and a third layer comprising at least one electrolytic polymer molecule of negative charge and at least one nanoparticle, wherein the second, dielectric layer comprises at least one nanoparticle coated with at least one polymer electrolyte.

21. The method of claim 20, wherein sealing comprises sealing a polar or non-polar parallel group of multiple cells forming a cell pack.

22. The method of claim 21, comprising sealing a non-polar parallel group of multiple cells.

* * * * *